United States Patent [19]

Wallin

[11] Patent Number: 4,969,306
[45] Date of Patent: Nov. 13, 1990

[54] APPARATUS FOR CLOSING A FILLED, FLANGED CARTON TRAY

[75] Inventor: Kay Wallin, Halmstad, Sweden
[73] Assignee: Sprinter System AB, Sweden
[21] Appl. No.: 359,759
[22] PCT Filed: Nov. 19, 1987
[86] PCT No.: PCT/SE87/00544
   § 371 Date: May 16, 1989
   § 102(e) Date: May 16, 1989
[87] PCT Pub. No.: WO88/03894
   PCT Pub. Date: Jun. 2, 1988

[30] Foreign Application Priority Data
Nov. 19, 1986 [SE] Sweden ................................ 8604965

[51] Int. Cl.$^5$ .............................................. B65B 7/28
[52] U.S. Cl. .................................. 53/329; 53/DIG. 2; 53/311; 53/333
[58] Field of Search ............... 53/207, 281, 282, 329, 53/333, 373, DIG. 2, 310, 311, 312, 313, 314, 315, 316, 485, 487, 488

[56] References Cited

U.S. PATENT DOCUMENTS

| 2,889,675 | 6/1959 | Anderson | 53/329 X |
| 3,064,697 | 11/1962 | Maione | 53/281 X |
| 3,124,916 | 3/1964 | Anderson et al. | 53/282 |
| 3,325,969 | 6/1967 | Bemiss et al. | 53/373 |
| 3,626,659 | 12/1971 | Breitbach | 53/313 X |
| 3,780,493 | 12/1973 | Baker | 53/329 X |
| 3,812,641 | 5/1974 | Bemiss | 53/282 X |
| 3,866,387 | 2/1975 | Davis | 53/329 X |
| 3,994,117 | 11/1976 | Kinney | 53/282 X |
| 4,102,113 | 7/1978 | Raque et al. | 53/333 X |
| 4,559,092 | 12/1985 | Oakley | 156/69 |
| 4,742,666 | 5/1988 | Mueller et al. | 53/329 X |

FOREIGN PATENT DOCUMENTS 8602229 4/1986 PCT Int'l Appl. .

Primary Examiner—Robert L. Spruill
Assistant Examiner—Beth Bianca
Attorney, Agent, or Firm—Ostrolenk, Faber, Gerb & Soffen

[57] ABSTRACT

A method and apparatus for sealing a filled, flanged carton tray with a flat lid. The tray is advanced into a sealing machine while resting on a conveyor (3) and at random spacing between trays. At a predetermined position the tray has a lid (2) placed on it, the lid (2) engaging against a stop curtain (4) and awaiting the tray (1), this being the lid (2) which is to be sealed against the flanges of the tray. The tray with the lid on it is then advanced by rollers (5–8) into a first microwave applicator (11), which includes longitudinal rails (12, 13) with a C-shaped cross section, for sealing a pair of opposing lid edge portions against respective flanges of the tray (1), subsequent to which, compression or sealing rollers (14–17) situated in the advancing direction of the conveyor press against the lid (2), which was sealed immediately previously, and before the tray (1) is turned 90° horizontally for sealing in a second microwave applicator (19) the remaining, opposing parts of the lid (2) against the respective flanges on the tray (1).

14 Claims, 3 Drawing Sheets

APPARATUS FOR CLOSING A FILLED, FLANGED CARTON TRAY

The present invention relates to a method and apparatus for closing a filled, flanged carton tray with the aid of a flat lid.

The machines used today for sealing such packs have been found to be both expensive in manufacture and operation as well as in maintenance.

The object of the present invention is to provide a machine which is cheap to produce and to operate, with the aid of which a filled tray can be sealed very efficiently.

SUMMARY OF THE INVENTION

The present invention relates to a method and apparatus for sealing lids onto cartons, the apparatus including: conveying means for conveying the cartons without regard to the spacing between the cartons; lid applying means for applying the lids onto the cartons; heat generating means for generating heat to fix the lids to the cartons; pressing means for subsequently pressing the lids against the cartons; turning means for subsequently turning the cartons; and further fixing means for subsequently further fixing the lids to the cartons.

Preferably, the conveying means includes a belt conveyor. Preferably, the belt conveyor includes a short feed section for conveying the cartons toward the lid applying means, the conveying means including a second belt conveyor for conveying the cartons from the lid applying means.

Preferably, the lid applying means includes moving means for moving the lids to a lid applying position above the conveying means. Preferably, the lid applying means includes stopping means for stopping each of the lids until a respective one of the cartons is located below the lid applying position. Preferably, the apparatus includes transferring means for transferring the lids and the cartons to the heat generating means. Preferably, the stopping means is actuated by the cartons to release the lids from the stopping means. Preferably, the stopping means includes a stop curtain. Preferably, the moving means includes rails. Preferably, the transferring means includes rollers.

Preferably, the heating means includes a microwave applicator. Preferably, the microwave applicator includes rails, the rails being C-shaped so as to accommodate the lids and the cartons.

Preferably, the pressing means includes rollers.

Preferably, the turning means includes means for horizontally rotating the cartons through 90°.

Preferably, the further fixing means includes a microwave applicator.

BRIEF DESCRIPTION OF THE DRAWINGS

The invention will now be described in more detail below with reference to the accompanying drawings, on which

DETAILED DESCRIPTION OF THE PREFERRED EMBODIMENTS

Figure 1:
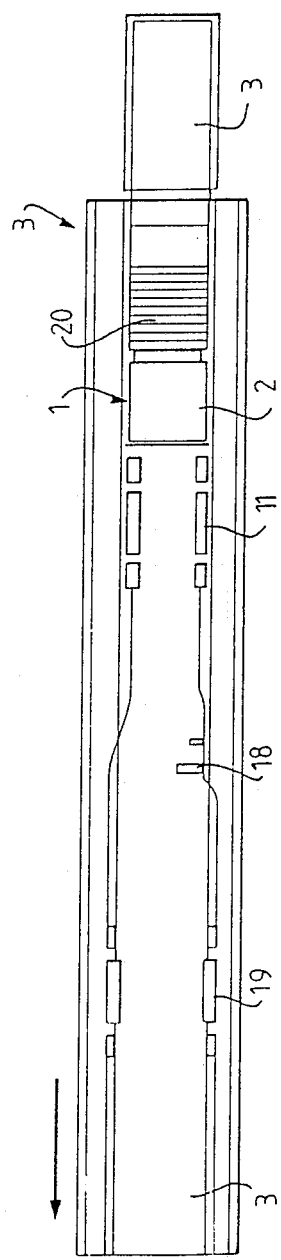
FIG. 1 is a schematic plan of a sealing machine in accordance with the present invention.
Figure 2:
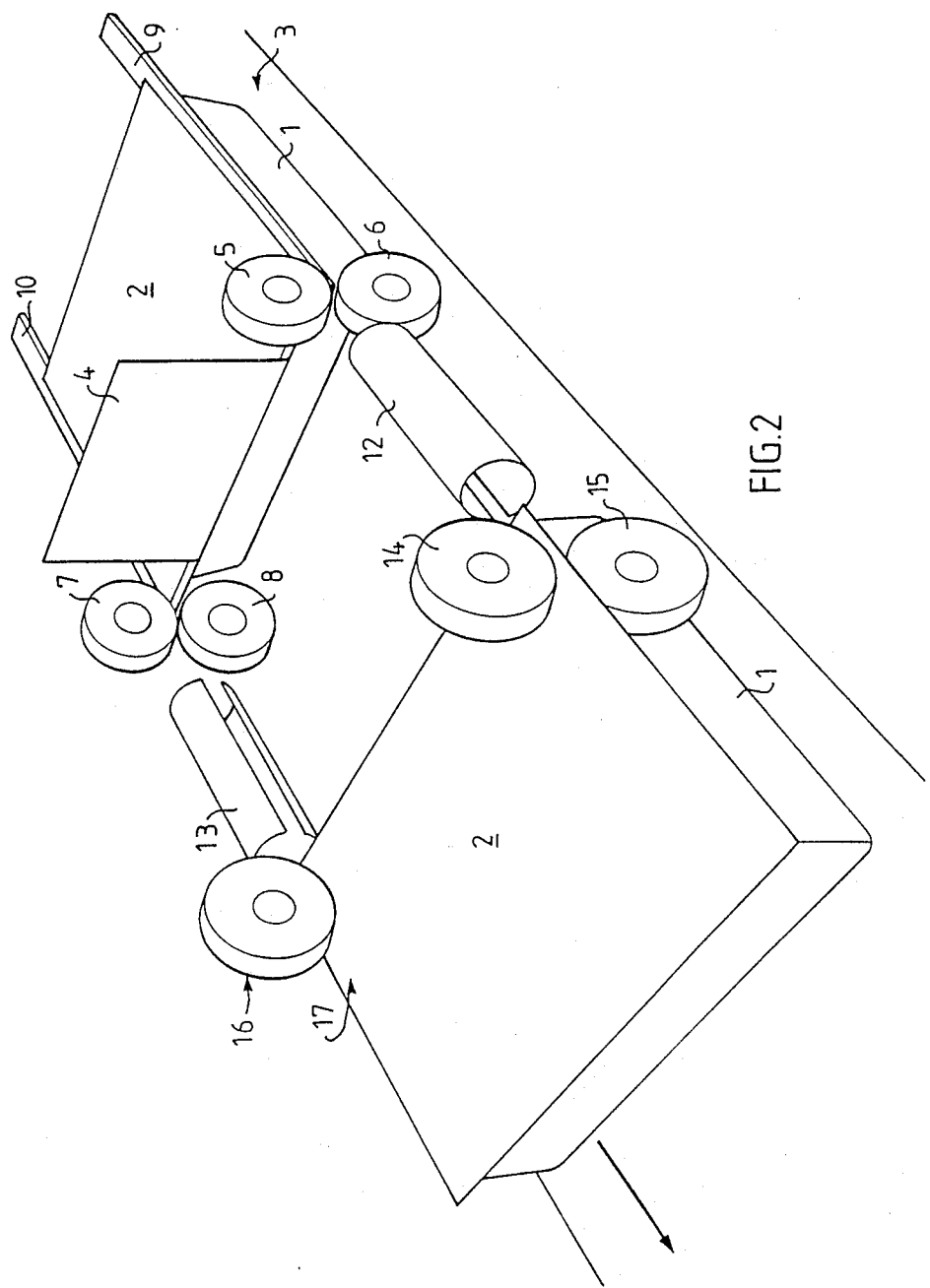
FIG. 2 is a schematic perspective view of a part of the machine illustrated in FIG. 1, this part being at the approach end of the machine seen in the advancing direction of the tray.
Figure 3:
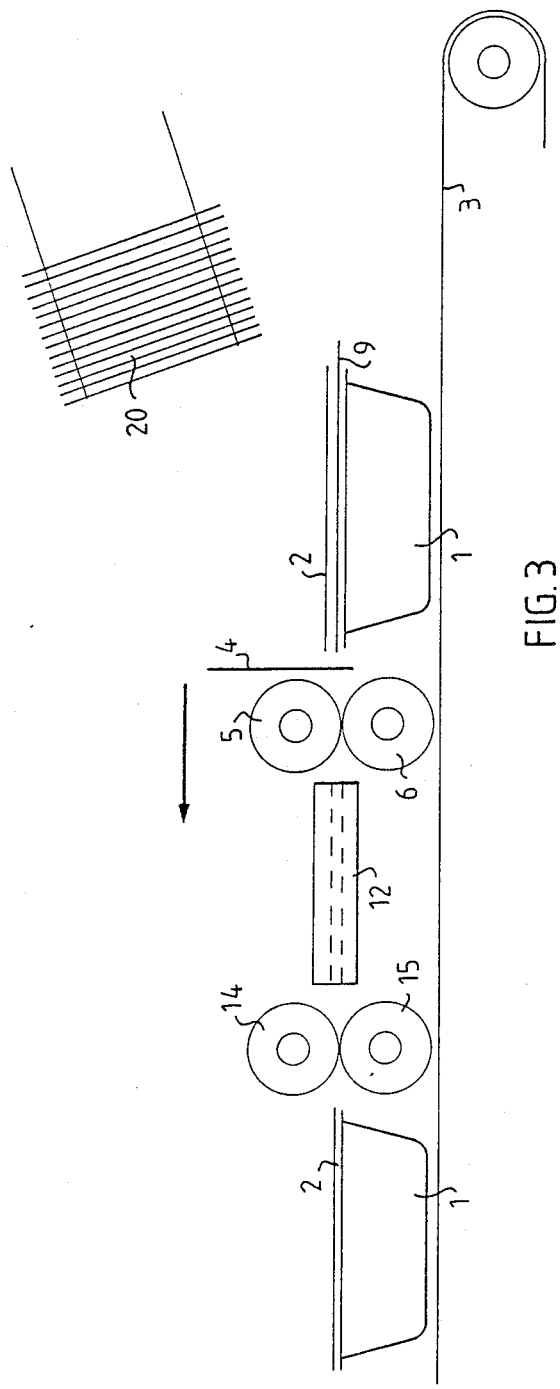
FIG. 3 is a schematic side view of the approach part seen in the direction of tray advance of the machine illustrated in FIG. 1, and also shows the part of the machine illustrated in FIG. 2.

The machine illustrated on the drawings has at least one conveying means 3 passing through it for advancing and simultaneously sealing flanged trays 1, which have been filled somewhere else. The trays 1 are advanced with no particular spacing on the conveyor means 3 and come into the forward part of the machine, seen in the advancing direction of the trays 1, and up to a position in front of a stop curtain 4, against which a lid 2 is already lying in wait for the tray 1 it is to seal. The lid 2 is supplied from a magazine 20 situated above the conveyor means 3, and is supported in position above the carton by longitudinal rails 9, 10 situated along and above the means 3 and the trays 1 on said means 3. When the lid 2 is situated directly above a tray 1 below it, both are simultaneously advanced by rollers 5, 6, 7, 8 situated on either side of the means 3. Tray and lid are advanced together to a first microwave applicator 11, which includes C-shaped rails 12, 13 on either side of the conveyor means 3. The flanges of the tray and the sealing edges of the lid are accommodated in the gaps of the rails 12, 13 and sealed together with the aid of microwaves. After the applicator 11 there are pressure rollers 14, 15, 16, 17 intended to press the sealed flange and lid parts together before the tray 1 is advanced to a turntable means 18, where the tray 2 is turned horizontally through an angle of 90° to enable sealing the remaining flanges of the tray 1 to the lid or vice versa, with the aid of a second microwave applicator 19, which is situated after the turntable means 18 but before a discharge part of the machine. The second microwave applicator 19 is formed similar to the first one, and operates in the same way. In the illustrated embodiment, the conveyor means 3 is made up from standard belt conveyors, and comprises two sections, a short feed section and a section for remaining steps in the machine. A rotary principle is used for transferring the lids from the magazine 20. Setting-up for different tray sizes can be done manually within a period of 30 minutes.

I claim:

1. An apparatus for sealing a flat lid onto a carton tray, the flat lid having first and second pairs of opposing sides, the carton tray being filled, the carton tray having first and second pairs of opposing flanges, the opposing sides of the flat lid corresponding to the opposing flanges of the carton tray, said apparatus comprising:

a conveyor for conveying the carton tray through said apparatus without regard to the position of the carton tray with respect to other carton trays;

rails for supporting the flat lid above said conveyor;

a stop curtain for maintaining the flat lid against said rails until the carton tray is located beneath the flat lid;

a microwave applicator for fixing the first pair of opposing sides to the first pair of flanges, said microwave applicator including rails, said rails of said microwave applicator being C-shaped so as to accommodate the first pair of sides and the first pair of flanges during fixing of the first pair of sides to the first pair of flanges;

advancing rollers for advancing the carton tray and the flat lid toward the microwave applicator, said advancing rollers being located close to said stop curtain;

pressure of sealing rollers for subsequently pressing down on the flat lid;

turning means for subsequently horizontally turning the carton tray through 90°; and a second microwave applicator for subsequently sealing the second pair of flanges to the flat lid.

2. An apparatus for sealing lids onto cartons, said apparatus comprising:

conveying means for conveying the cartons without regard to the spacing between the cartons;

lid applying means for applying the lids onto the cartons;

heat generating means for generating heat to fix the lids to the cartons;

pressing means for subsequently pressing the lids against the cartons;

turning means for subsequently turning the cartons; and further fixing means for subsequently further fixing the lids to the cartons;

wherein said lid applying means includes moving means for moving the lids to a lid applying position above said conveying means;

wherein said lid applying means includes stopping means for stopping each of the lids until a respective one of the cartons is located below the lid applying position.

3. The apparatus of claim 2, wherein said conveying means includes a belt conveyor.

4. The apparatus of claim 3, wherein said belt conveyor includes a short feed section for conveying the cartons toward said lid applying means, said conveying means including a second belt conveyor for conveying the cartons from said lid applying means.

5. The apparatus of claim 2, wherein said apparatus includes transferring means for transferring the lids and the cartons to said heat generating means.

6. The apparatus of claim 5, wherein said stopping means is actuated by the cartons to release the lids from said stopping means.

7. The apparatus of claim 6, wherein said stopping means includes a stop curtain.

8. The apparatus of claim 7, wherein said moving means includes rails.

9. The apparatus of claim 8, wherein said transferring means includes rollers.

10. The apparatus of claim 2, wherein said heat generating means includes a microwave applicator.

11. The apparatus of claim 10, wherein said microwave applicator includes rails, said rails being C-shaped so as to accommodate the lids and the cartons.

12. The apparatus of claim 2, wherein said pressing means includes rollers.

13. The apparatus of claim 2, wherein said turning means includes means for horizontally rotating the cartons through 90°.

14. The apparatus of claim 2, wherein said further fixing means includes a microwave applicator.

* * * * *